US009172289B2

(12) United States Patent
Kreidler et al.

(10) Patent No.: US 9,172,289 B2
(45) Date of Patent: Oct. 27, 2015

(54) WIRE GUIDE FOR USE IN AN ELECTRIC MACHINE

(71) Applicant: REGAL BELOIT AMERICA, INC., Beloit, WI (US)

(72) Inventors: Jason Jon Kreidler, Sheboygan Falls, WI (US); William Joseph Conway, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 214 days.

(21) Appl. No.: 13/686,302

(22) Filed: Nov. 27, 2012

(65) Prior Publication Data

US 2014/0145545 A1 May 29, 2014

(51) Int. Cl.
*H02K 3/34* (2006.01)
*H02K 15/00* (2006.01)
*H02K 3/32* (2006.01)
*H02K 3/52* (2006.01)
*H02K 15/095* (2006.01)

(52) U.S. Cl.
CPC .............. *H02K 15/00* (2013.01); *H02K 3/325* (2013.01); *H02K 3/522* (2013.01); *H02K 15/095* (2013.01); *H02K 3/34* (2013.01); *H02K 3/345* (2013.01); *Y10T 29/49012* (2015.01)

(58) Field of Classification Search
CPC ......... H02K 3/34; H02K 3/345; H02K 3/325; H02K 15/04; H02K 3/48
USPC ................................................ 310/214, 215
See application file for complete search history.

(56) References Cited

U.S. PATENT DOCUMENTS

| 3,873,985 | A | 3/1975 | Altmayer |
| 5,044,065 | A | 9/1991 | Dyke |
| 5,063,279 | A | 11/1991 | Rossi |
| 5,155,403 | A | 10/1992 | Dyke |
| 5,306,976 | A | 4/1994 | Beckman |
| 5,765,274 | A | 6/1998 | Beakes |
| 6,002,190 | A | 12/1999 | Kieffer |
| 6,018,207 | A | 1/2000 | Saban et al. |
| 6,092,276 | A | 7/2000 | Beakes |
| 6,163,949 | A | 12/2000 | Neuenschwander |
| 6,192,575 | B1 | 2/2001 | Neuenschwander |
| 6,509,665 | B1 | 1/2003 | Nishiyama et al. |
| 6,523,247 | B2 | 2/2003 | Mirpuri et al. |
| 6,590,310 | B2 * | 7/2003 | Takano ................. 310/216.074 |
| 6,744,166 | B2 | 6/2004 | Harter et al. |
| 6,847,285 | B2 | 1/2005 | Sirois et al. |
| 6,984,913 | B2 | 1/2006 | Neuenschwander |
| 7,062,841 | B2 | 6/2006 | Neuenschwander |
| 7,086,317 | B2 | 8/2006 | Bender |
| 7,111,380 | B2 | 9/2006 | Sheeran et al. |

(Continued)

FOREIGN PATENT DOCUMENTS

CN 201153223 Y 11/2008
EP 419849 B1 5/1994

(Continued)

*Primary Examiner* — Hanh Nguyen
(74) *Attorney, Agent, or Firm* — John Wagley

(57) ABSTRACT

A wire assembly for use in an electric machine is provided. The assembly includes a member and a wire. The wire conducts electrical current. At least a portion of the wire is adapted to be wrapped at least partially around the member. The member defines a periphery of the member. At least a portion of the periphery of the member is conformable when the wire is wrapped at least partially around the member.

21 Claims, 13 Drawing Sheets

(56) References Cited

U.S. PATENT DOCUMENTS

| | | |
|---|---|---|
| 7,262,579 B1 | 8/2007 | Shepard |
| 7,382,075 B2 | 6/2008 | Wang et al. |
| 7,414,347 B2 | 8/2008 | Wang et al. |
| 7,471,025 B2 | 12/2008 | Sheeran et al. |
| 7,586,231 B2 | 9/2009 | Wang et al. |
| 7,709,992 B2 | 5/2010 | Hussey et al. |
| 7,752,733 B1 | 7/2010 | Badgerow |
| 8,513,851 B2 * | 8/2013 | Tsukamoto et al. .......... 310/215 |
| 2001/0006597 A1 | 7/2001 | Neuenschwander |
| 2004/0084988 A1 | 5/2004 | Sheeran et al. |
| 2004/0207501 A1 | 10/2004 | Souki |
| 2006/0071569 A1 | 4/2006 | Stewart et al. |
| 2007/0114877 A1 | 5/2007 | Wang et al. |
| 2007/0188125 A1 | 8/2007 | Shepard |
| 2007/0194653 A1 * | 8/2007 | Prokscha et al. ............... 310/218 |
| 2007/0279178 A1 * | 12/2007 | Zimmer et al. ................ 336/208 |
| 2008/0129142 A1 | 6/2008 | Sheeran et al. |
| 2009/0058206 A1 | 3/2009 | Bremner |
| 2009/0189474 A1 * | 7/2009 | van Heyden et al. ......... 310/195 |
| 2010/0127587 A1 | 5/2010 | Qin et al. |
| 2010/0181853 A1 | 7/2010 | Wong et al. |
| 2011/0037352 A1 | 2/2011 | Lin et al. |
| 2011/0140567 A1 | 6/2011 | Horst et al. |
| 2011/0291519 A1 | 12/2011 | Modi et al. |
| 2012/0126659 A1 * | 5/2012 | Jurkowski .............. 310/216.074 |
| 2012/0313477 A1 * | 12/2012 | Haga et al. .................... 310/208 |

FOREIGN PATENT DOCUMENTS

| | | |
|---|---|---|
| EP | 459629 B1 | 10/1995 |
| EP | 584841 B1 | 6/1999 |
| GB | 539525 A | 9/1941 |
| GB | 759652 A | 10/1956 |
| GB | 816675 A | 7/1959 |
| GB | 1438452 A | 6/1976 |
| GB | 1481928 A | 8/1977 |
| GB | 2023040 A | 12/1979 |
| JP | 2008148497 A | 6/2008 |
| KR | 2009084994 A | 6/2009 |
| KR | 101002958 B1 | 12/2010 |
| WO | 9744881 A1 | 11/1997 |

* cited by examiner

US 9,172,289 B2

WIRE GUIDE FOR USE IN AN ELECTRIC MACHINE

BACKGROUND OF THE INVENTION

The embodiments described herein relate generally to an electric machine, and more specifically, to a wire guide associated with the electric machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

In an assembled configuration the coils are positioned in a spaced apart relationship about the stationary assembly that typically has a generally hollow cylindrical configuration with the coils positioned internally. The power of the electric motor is dependent on the amount of energy that may be applied to the coils and that amount of energy is proportional to the amount of wire that may be positioned about the stationary assembly. The amount of wire positioned about the stationary assembly is typically referred to as the slot fill. Placing as much wire in the coils as possible, also known as maximizing the slot fill is thus desirable.

Of many methods of manufacturing the stator and winding the wire to form the coil in particular, the following three methods are typical. The first is to form a rigid hollow cylindrical core with internal protrusions of teeth around which the coils are wound. The core is typically produced by stacking a plurality of rigid hollow laminations and joining them to form the rigid hollow cylindrical core. This method requires the wire to be fed around the teeth with a device called a needle. The need to provide for movement of the needle around the teeth limits the amount of wire that may be used to form the coil.

A second method is to similarly form a rigid hollow cylindrical core with internal protrusions of teeth and to provide spools or bobbins that may be removably secured to the teeth of the core. The coils are formed by winding wire around the coils while separated from the stator and then by assembling the wound bobbins onto the teeth of the stator. The separated coils provide improved access around the coil to more completely form the coil.

A third known method of manufacturing a stationary assembly includes stacking a plurality of laminations and rolling the stack to form a round stator. The laminations are stamped from a sheet of stock material and stacked to form a substantially linear array of stator sections and connecting members. The substantially linear array includes a first end and a second end. Teeth are formed along one side of the linear array. Windings may be wound on the stator sections around the teeth while the laminations are in the linear orientation in a configuration where the linear array of laminations are arched with the teeth positioned outwardly. Once the windings are positioned on the stator sections, the stack is formed into a second shape. To form the stack into the second shape, the stack is rolled around a central axis and the first end is coupled to the second end with the teeth positioned inwardly. The second shape is the substantially round shape of a stator. Typically, the second shape is maintained by securing the first end to the second end. The linear arrays provide improved access around the teeth to more completely form the coil.

Regardless of which method is used to form the coil, maximizing the amount of wire (also known as maximizing the slot fill or wire density) includes uniformly winding the wires in a plurality of layers around the teeth. Wires in each layer are preferably positioned abutted against each other and the wire in any layer is preferably cradled between adjacent wires in the layer below that layer of wire. This arrangement of wires to form the coils is typically called a precision arrangement and is preformed with a precision wire laying process. Providing this arrangement and maintaining the proper tension on the wires while providing high speed automated assembly has been a challenge.

Other arrangements of the wires are typically called random windings. With such random windings, the tight abutting relationship of wires within a layer is not maintained. For example, the wires have difficulty tracking in the cradle formed between adjacent wires and may tend to separate from the wires on which the wire above is cradling, permitting wires in an upper layer to migrate into the space between the wires of the lower layer. This migration of the wires causes the wires of upper layers to cross over the wires of the lower layers at random locations, creating bulges in the coil and less complete or inferior slot fill. The present invention is directed to alleviate at least some of these problems with the prior art.

BRIEF DESCRIPTION OF THE INVENTION

In one aspect, a wire assembly for use in an electric machine is provided. The assembly includes a member and a wire. The wire conducts electrical current. At least a portion of the wire is adapted to be wrapped at least partially around the member. The member defines a periphery of the member. At least a portion of the periphery of the member is conformable when the wire is wrapped at least partially around the member.

In another aspect, a stator for use in an electric machine is provided. The stator includes a body having a base and a plurality of projections extending from the base. The stator also includes a wire. The wire is adapted for conducting electrical current through the wire. At least a portion of the wire is adapted to be wrapped at least partially around at least one of the projections of the body. At least one of the projections of the body defines a periphery of the projection. At least a portion of the periphery of the projection is conformable when the wire is wrapped at least partially around the at least one of the projections of the body.

In yet another aspect, a cap for covering a portion of a stator for use in an electric machine having wire to conduct electricity there though is provided. The cap comprising a body adapted to closely conform to at least a portion of the stator. The body defines a periphery of the body. At least a portion of the periphery of the body is conformable when the wire is wrapped at least partially around the body.

In yet another aspect, a method for guiding a wire while winding a coil of an electric machine is provided. The method includes providing a component with a peripheral portion made of a deformable material. The method also includes guiding a first winding of the wire over the peripheral portion of said component. The method further includes deforming the peripheral portion with the first winding of the wire.

In yet another aspect, a stator for use in an electric machine is provided. The stator includes a body having a base and a plurality of projections extending from the base and a wire. The wire being adapted for conducting electrical current through the wire. At least a portion of the wire adapted to be wrapped at least partially around at least one of the projections of the body. At least one of the projections of the body defining a periphery of the projection. At least a portion of the periphery of the body being tapered.

DETAILED DESCRIPTION OF THE INVENTION

The methods, systems, and apparatus described herein facilitate the winding of wire to form a coil within an electric machine. Wire is wound around teeth or bobbins to form coils. To optimize wire fill and motor power the wire is optimally uniformly wound with adjacent wires in a closely uniformly packed relationship. Difficulties may occur maintaining this closely uniformly packed relationship. Added care may alleviate difficulties with such closely uniformly packed relationship, but may reduce productivity and add costs to the electric machine.

The methods, systems, and apparatus described herein assist in the proper closely uniformly packed relationship of the wires within motor coils. The methods, systems, and apparatus described herein may also facilitate assembly speed and accuracy. Furthermore, the methods, systems, and apparatus described herein provide for an improved appearance of the motor and its appeal to the customer.

Technical effects of the methods, systems, and apparatus described herein include at least one of improved performance and quality and reduced labor costs.

Figure 1:
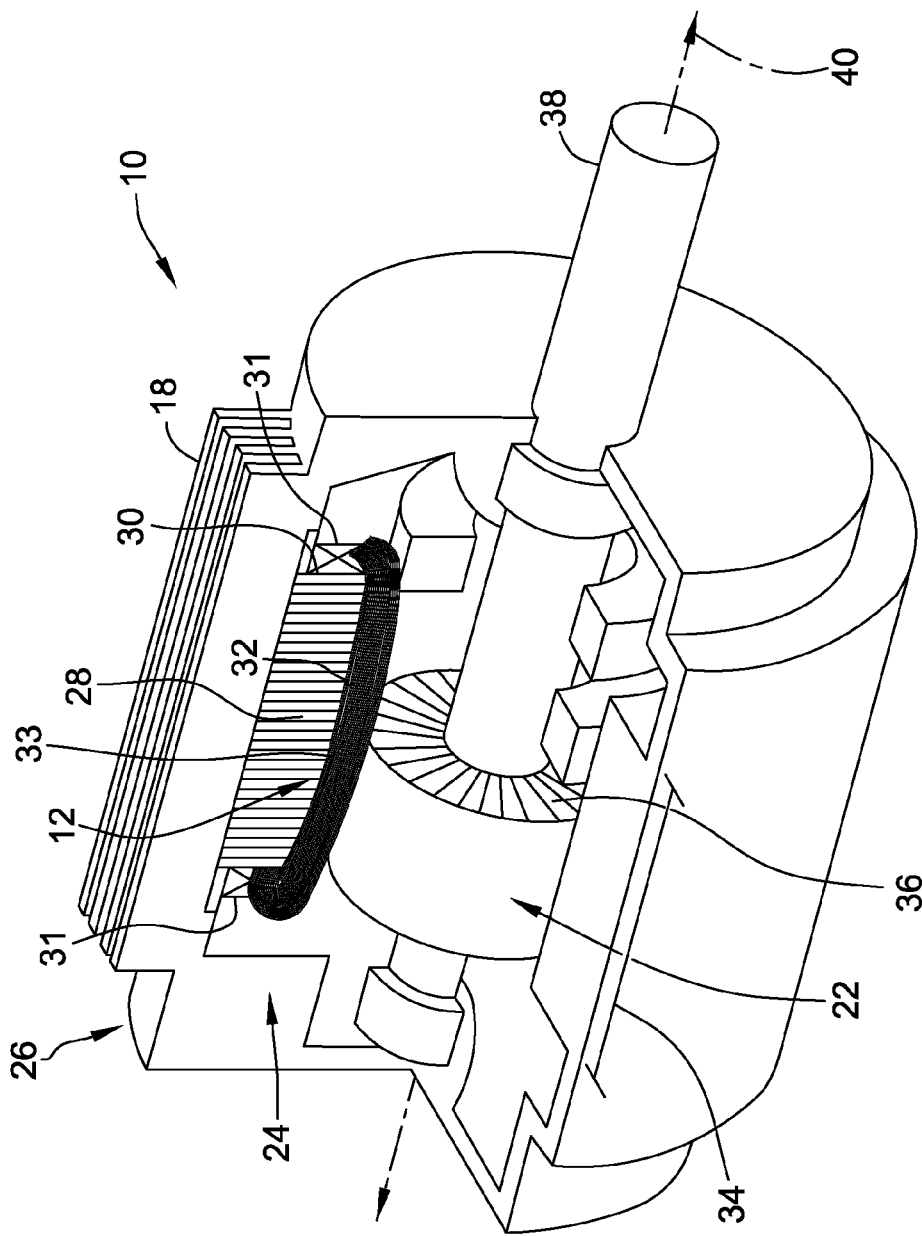
FIG. 1 is a perspective view of a motor embodying the exemplary wire guide of the present invention.

FIG. 1 is a perspective cut-away view of an exemplary electric machine 10 that includes a stationary assembly 12. Electric machine 10 also includes a machine assembly housing 18 and a rotatable assembly 22. Machine assembly housing 18 defines an interior 24 and an exterior 26 of machine 10 and is configured to at least partially enclose and protect stationary assembly 12 and rotatable assembly 22. Stationary assembly 12 includes a stator core 28, which includes a plurality of stator teeth or projections 30. End caps 31 are positioned over opposed end teeth of the plurality of stator teeth 30. Wire 33 is wound around stator teeth 30 and the end caps to form each of a plurality of windings 32. In an exemplary embodiment, stationary assembly 12 is a three phase salient pole stator assembly. Stator core 28 is formed from a stack of laminations made of a highly magnetically permeable material, and windings 32 are wound on stator core 28 in a manner known to those of ordinary skill in the art. Laminations are stacked such that stator core 28 reaches a predefined length 34. In the exemplary embodiment, the plurality of laminations that form the stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process. In another alternate embodiment, the windings 32 are wound around a plurality of spools (not shown), each of which is removably fitted to one of the stator teeth 30.

In one embodiment, rotatable assembly 22 includes a permanent magnet rotor core 36 and a shaft 38 and is configured to rotate around an axis of rotation 40. In the exemplary embodiment, rotor core 36 is formed from a stack of laminations made of a magnetically permeable material and is substantially received in a central bore of stator core 28. While FIG. 1 is an illustration of a three phase electric motor, the methods and apparatus described herein may be included within machines having any number of phases, including single phase and multiple phase electric machines.

In the exemplary embodiment, electric machine 10 is coupled to a fan (not shown) for moving air through an air handling system, for blowing air over cooling coils, and/or for driving a compressor within an air conditioning/refrigeration system. More specifically, machine 10 may be used in air moving applications used in the heating, ventilation, and air conditioning (HVAC) industry, for example, in residential applications using ⅓ horsepower (hp) to 1 hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 10 may engage any suitable work component and be configured to drive such a work component. Alternatively, electric machine 10 may be coupled to a power conversion component, for example, an engine, a wind turbine rotor, and/or any other component configured to rotate rotatable assembly 22 to generate electricity using electric machine 10.

Figure 2:
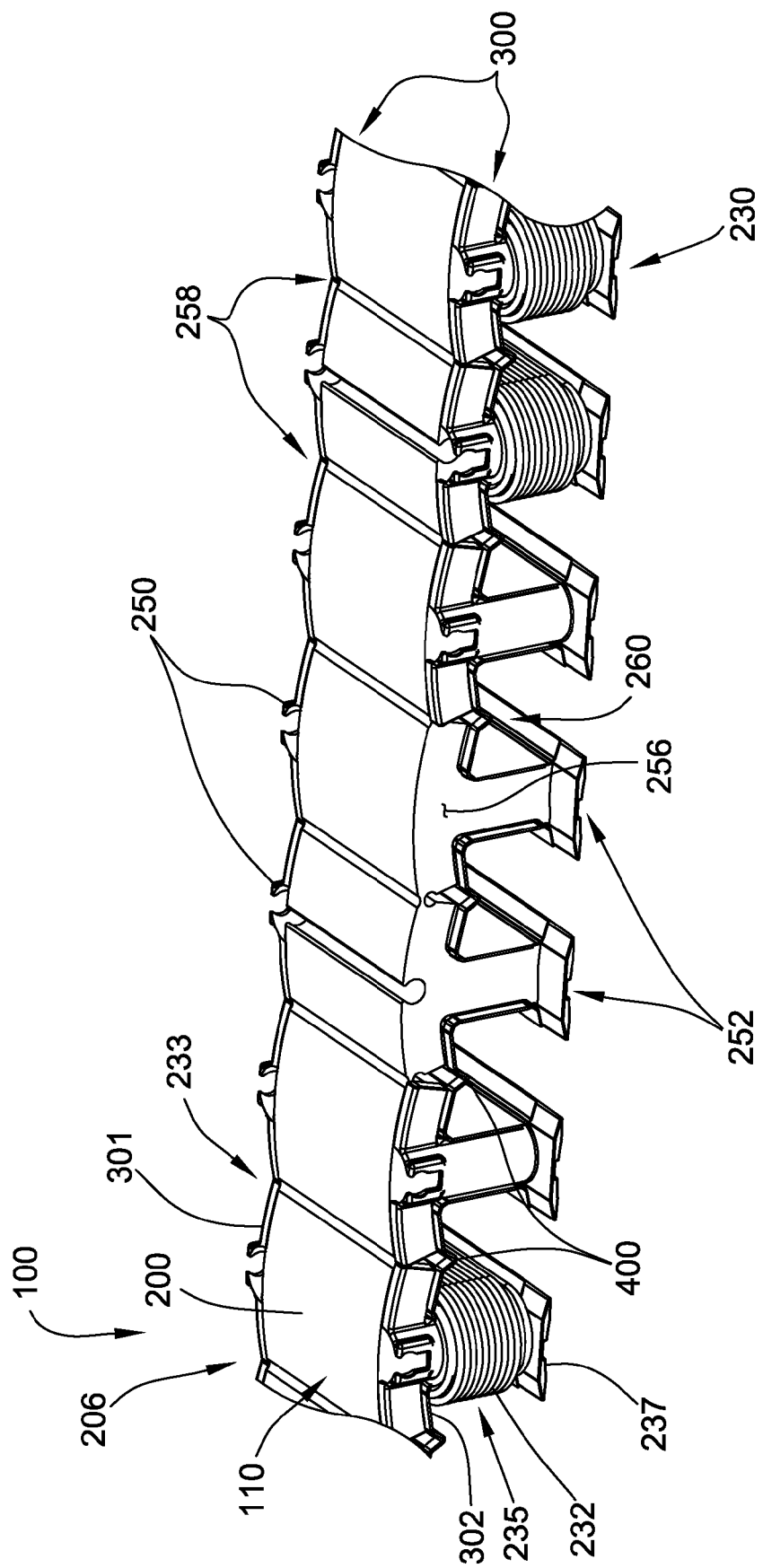
FIG. 2 is a perspective view of a portion of a roll-up stator with portions of the windings removed for use with the conformable portion and relieved portion of FIG. 1.

FIG. 2 is a partial perspective view of an exemplary stator assembly 100 with portions and components removed for clarity. In the exemplary embodiment, a stator assembly 100 is configured for use in, for example, a brushless direct current motor, a permanent magnet alternating current (PMAC) motor, and/or any other suitable electrical machine. In the exemplary embodiment, stator assembly 100 includes a stator core 110, a plurality of members or end caps 300, and a plurality of insulation members 400. End caps 300 may include a plurality of first end caps 302 and a plurality of second end caps 301. Stator assembly 100 includes a plurality of stator segments 200. Although illustrated as including twelve stator segments, stator assembly 100 may include any number of stator segments that allows stator assembly 100 to function as described herein. While, as shown the end caps and the insulation members are separate components, it should be appreciated that the endcaps may be integral with the insulation members. Further it should be appreciated that the insulation members and/or the end caps may be in the form of a coating placed over the teeth of the stator.

In the exemplary embodiment, each stator segment includes a first end cap 302 and a second end cap 301. Furthermore, in the exemplary embodiment, one of the plurality of insulation members 400 is positioned within a slot 260 defined between adjacent stator segments 200.

Moreover, in the exemplary embodiment, each of the plurality of stator segments 200 includes a yoke assembly 233, a foot assembly 237, and a tooth assembly 235 that extends between the yoke assembly and the foot assembly. For example, third stator segment 206 includes a yoke assembly 233, a foot assembly 237, and a tooth assembly 235 extending there between, Core 110 can be formed as a stack of flat laminations (not shown) made of a highly magnetically permeable material. The plurality of laminations that form core 110 may be either interlocked or loose laminations. In an alternative embodiment, core 110 is a solid core. Core 110 includes a plurality of teeth or projections 252, a plurality of yokes 250, and a plurality of flexible portions 258 configured to enable stator assembly 100 to be arranged annularly. Each tooth 252 extends from a respective yoke 250, and each flexible portion 258 connects adjacent yokes 250.

In the exemplary embodiment, each stator segment includes a tooth assembly and wire wound about the tooth assembly. For example, stator segment 206 includes tooth assembly 235. Wire 232 is wound about tooth assembly 235 between adjacent slots 260. As such, portions of insulation members 400 are positioned between tooth 252 of tooth assembly 235 and winding 230. Each end cap 300 has a substantially similar configuration, described in more detail below. In an alternative embodiment, stator segments 200 may not include end caps 300 as described in more detail below. In the exemplary embodiment, each end cap 300 is positioned between an end face 256 of core 110 and winding 230.

Figure 3:
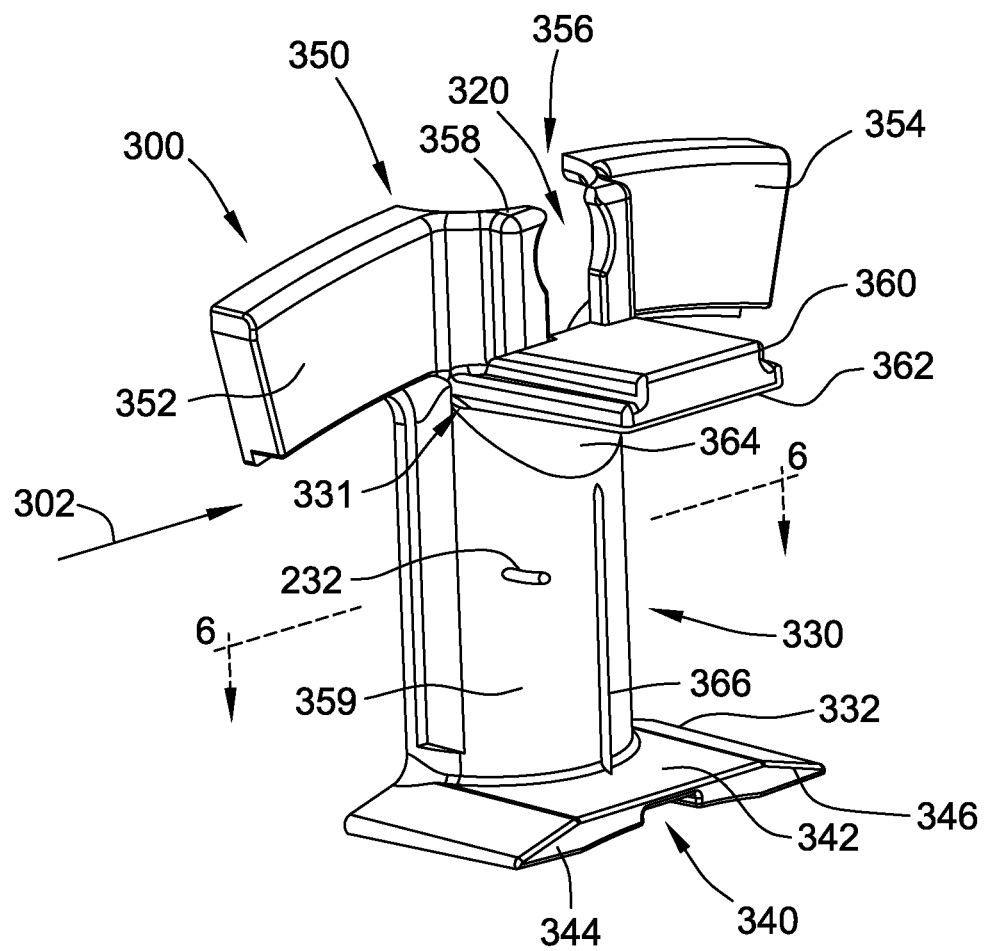
FIG. 3 is a perspective view of an end cap for a stator winding of an electric motor that includes an exemplary end cap with wire guide.
Figure 4:
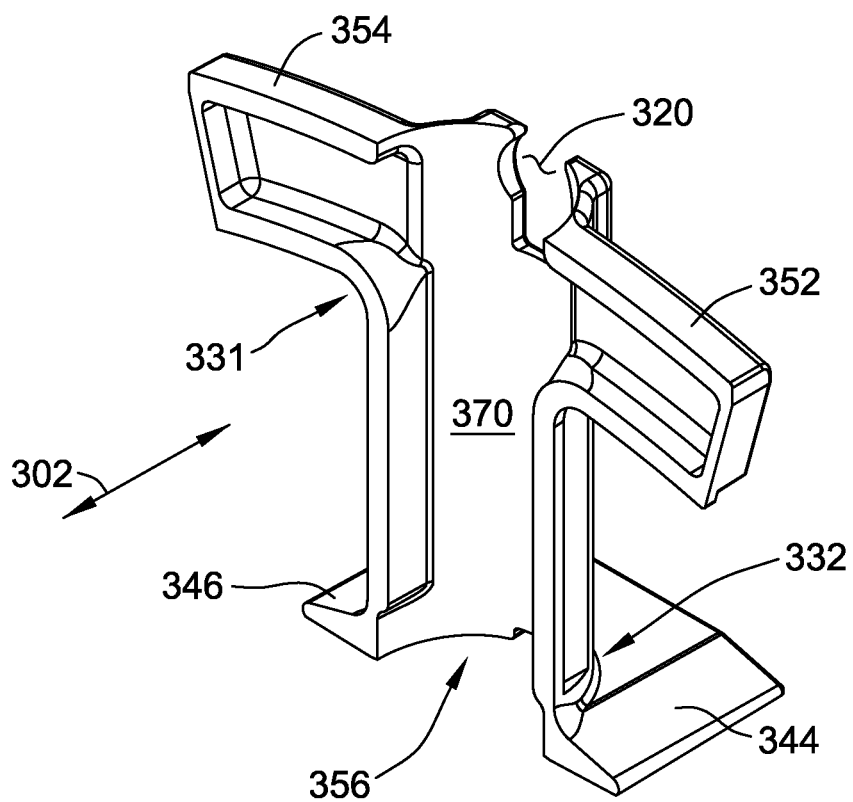
FIG. 4 is a perspective view of the opposite side of the end cap of FIG. 3.

FIGS. 3 and 4 are perspective views of an exemplary end cap, for example, first end cap 302. In the exemplary embodiment, a portion of end cap 302 has a substantially rounded shape that defines a semi-cylindrical cavity 356. More specifically, tooth portion 330 of end cap 302 has a substantially rounded shape. However, end cap 302 may have any suitable shape that allows stator assembly 100 (shown in FIG. 1) to function as described herein. End cap 300 includes tooth portion 330, yoke portion 350 formed at a first end 331 of tooth portion 330, and foot portion 340 formed at a second end 332 of tooth portion 330. Yoke portion 350 includes a first portion 352 that extends from tooth portion 330, a second portion 354 that extends from tooth portion 330, and a central portion 358. Central portion 358 is positioned at first end 331 of tooth portion 330 and between first and second portions 352 and 354. In the exemplary embodiment fastener aperture 320 is defined in central portion 358. In the exemplary embodiment, cavity 356 extends the length of tooth portion 330 from first end 331 to opposite second end 332. Foot portion 340 includes a central portion 342 substantially rectangular in shape and oriented substantially perpendicular to tooth portion 330. Foot portion 340 also includes a first portion 344 extending from tooth portion 330 and a second portion 346 extending from tooth portion 330 and central portion 342.

As shown in FIG. 3, the wire 232 is wrapped around periphery 359 of tooth portion 330 of the member or end cap 300 from the first end 331 to the second end 332 of the tooth portion 330. The wire 232 is contained at the second end 332 by central portion 342 of the foot portion 340 of end cap 300.

A stop 360 of central portion 358 of yoke portion 350 of end cap 300 extends generally normal to tooth portion 330 at the first end 331 of the tooth portion 330. The stop 360 may have any shape and, as shown is generally rectangular and includes a smooth planar surface or face 362 normal to the tooth portion 330. The wire 232 is contained at the first end 331 by smooth planar surface 362 of the stop 360 of end cap 300.

Figure 8:
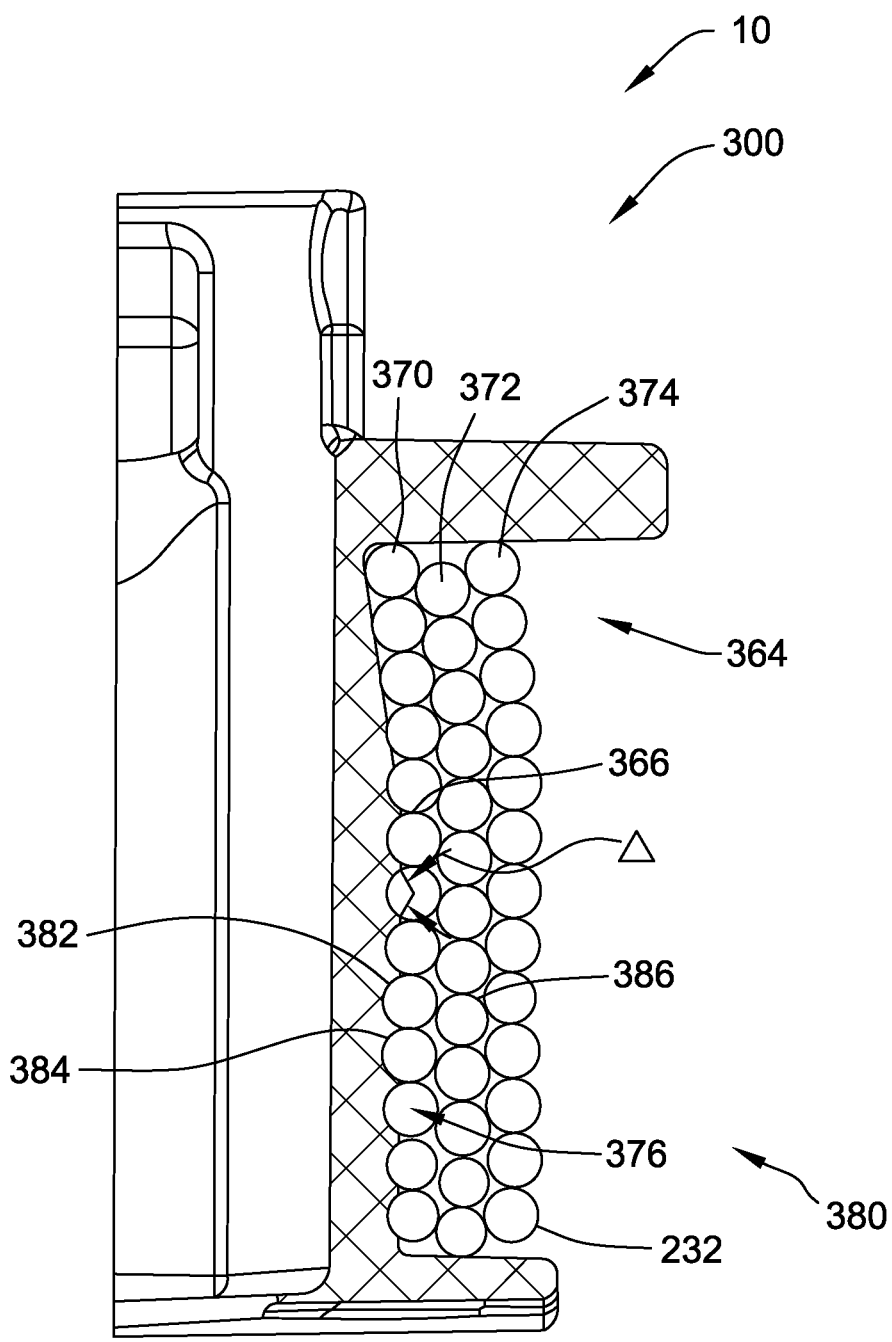
FIG. 8 is a cross sectional view along the line 8-8 in the direction of the arrows of the stator winding of FIG. 7.

According to an aspect of the invention and as shown in FIGS. 3 and 8, the periphery 359 of the tooth portion 330 may include a relieved portion 364. The relieved portion 364 provides a portion of the periphery where the wire 232 when placed in tension against the periphery 359 of the tooth portion 330 will be directed.

Figure 5:
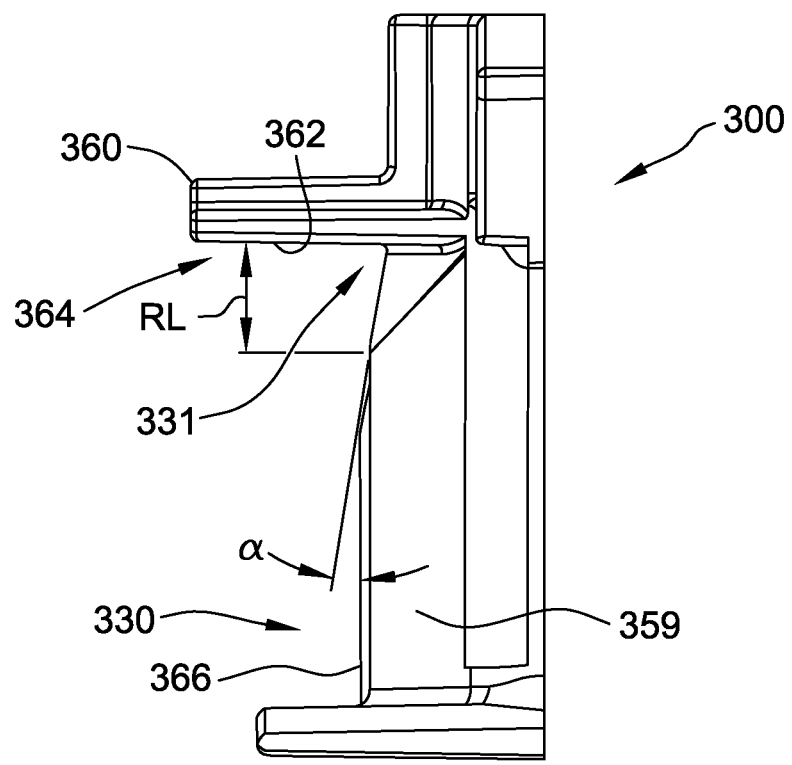
FIG. 5 is a plan view of the end cap of FIG. 1, showing the guide before being conformed by a wire.

For example and as shown in FIG. 5, the relieved portion 364 may be positioned at first end 331 of tooth portion 330. Providing a relieved portion 364 at first end 331 causes the wire to be urged against face 362 of stop 360 to provide for a starting position of the wire when winding the wire onto the tooth portion 330 of end cap 300 that promotes maximum slot fill and promotes the first several turns of the wire 232 to be held tightly towards the yoke of the stator.

Alternatively the relieved portion (not shown) may be positioned at second end 331 of tooth portion 330. Providing a relieved portion 364 at second end 331 causes the wire to be urged against central portion 342 of foot portion 340 of end cap 300 to provide for a alternate starting position of the wire 232.

Referring again to FIG. 5, the relieved portion 364 may be tapered inwardly and toward the face 362 of stop 360. The relieved portion 364 may be lineally relieved in the axial direction as shown in FIG. 8, also known as tapered in the axial direction. Alternatively the relief in the axial direction may be arcuate, either concave or convex or a combination thereof. As shown, the relieved portion 364 extends a distance RL from the face 362 of stop 360 axially inwardly. As shown the relieved portion 364 is a simple or singular taper or angular surface. It should be appreciated that the relieved portion may consist of a plurality of angles or an arcuare or plurality of arcuate surfaces. The relieved portion 364, as shown forms an angle alpha with cylindrical portion of periphery 359 of the tooth portion 330. The distance RL may be any distance capable of guiding at least one wire 232 and should be at least the radius of the wire to be guided. As shown the distance RL is approximately 3-15 times longer that the diameter of the wire to be guided, depending on the wire diameter and the assembly tooling utilized. The angle α may be any angle and should be selected to provide wire guidance while minimizing the effect the relieved portion may have on slot fill. For example, the angle α is from 0 to 40 degrees, 8 to 20 degrees or, as shown, approximately 8 degrees.

According to another aspect of the invention, at least a portion of the periphery 359 of the tooth portion 330 is preferably is made of a conformable material, for example a deformable or compressible material, such that the wire 232 when installed against the periphery 359 conforms, for example, compresses or deforms, the periphery 359 and thereby assists in maintaining the wire 232 is its axial position along the periphery 359 of the tooth portion 330 of end cap 300.

While the entire periphery 359 of the tooth portion 330 may be made of the conformable material, according to another aspect of the invention and as shown in FIG. 3, only a portion of the periphery 359 of the tooth portion 330 may be made of the conformable material. For example, a conformable portion of the end cap 300 may be in the form of a protrusion 366 extending from periphery 359 of tooth portion 330 of end cap 300. The protrusion 366 may have any shape and may extend from any portion of the periphery 359 of tooth portion 330 of end cap 300. The protrusion 366 preferably is made of a deformable or compressible material, such that the wire 232 when installed against the protrusion 366 compresses or deforms the protrusion 366 and thereby assists in maintaining the wire 232 is its axial position along the periphery 359 of the tooth portion 330 of end cap 300.

While it should be appreciated that the protrusion 366 may be made of a compressible material that may even be resilient, the use of a deformable material that maintains a groove or indention when the wire is removed, may better contain the wire axially.

It should be further appreciated that the protrusion 366 may extend axially along the length of the periphery 359 of the tooth portion 330 of end cap 300 from the first end 331 to the second end 332. For simplicity, and as shown in FIG. 3, the protrusion 366 extends in an axial direction and may have a uniform cross section.

Figure 6:
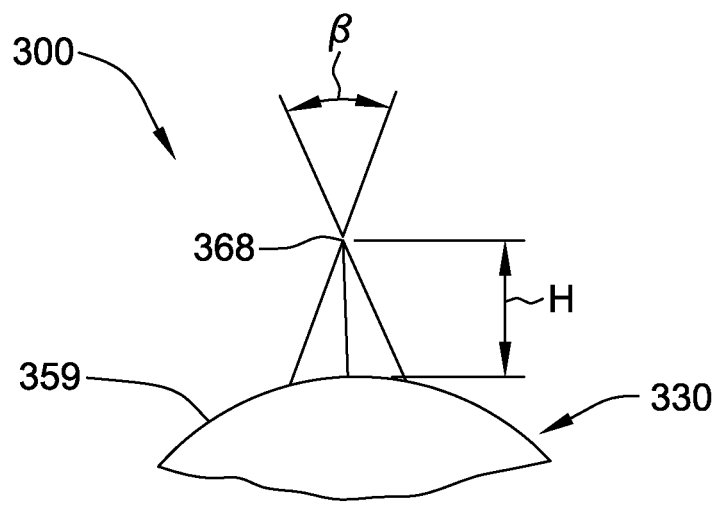
FIG. 6 is a partial cross sectional view of FIG. 3 along the line 6-6 in the direction of the arrows showing the protrusion of the end cap of FIG. 3 in greater detail.

As shown in FIG. 6, the protrusion 366 may have a triangular cross section, with a two sides tapering outwardly from the periphery 359 of tooth portion 330 toward each other to a point 368 with an included angle β. The point 368 is spaced a distance H from to the periphery 359 of tooth portion 330. The distance H may be any distance and may be chosen to be less than the diameter of the wire to be wound and may be around the radius of the wire to be wound.

It should be appreciated that the end cap may be provided with only one of the relieved portion 364 of the periphery 359 of the tooth portion 330 and the protrusion 366, as both serve to assist in directing the wire 232 when wound into a coil to assist in providing precision placement of the wires and maximizing slot fill. The combination of the relieved portion 364 of the periphery 359 of the tooth portion 330 and the protrusion 366 may, however, provide enhanced placement of the wires and enhanced slot fill. When using both the relieved portion 364 and the protrusion 366, the protrusion may not be required to be positioned in the relieved portion 364. In fact, if the protrusion were to be placed in the relieved portion 364, the protrusion may be deformed by the wire as it descends along the relieved portion 364 toward the first end of the tooth portion, causing the wire to be trapped in the protrusion in a position spaced from the face 362 of the stop 360.

Figure 7:
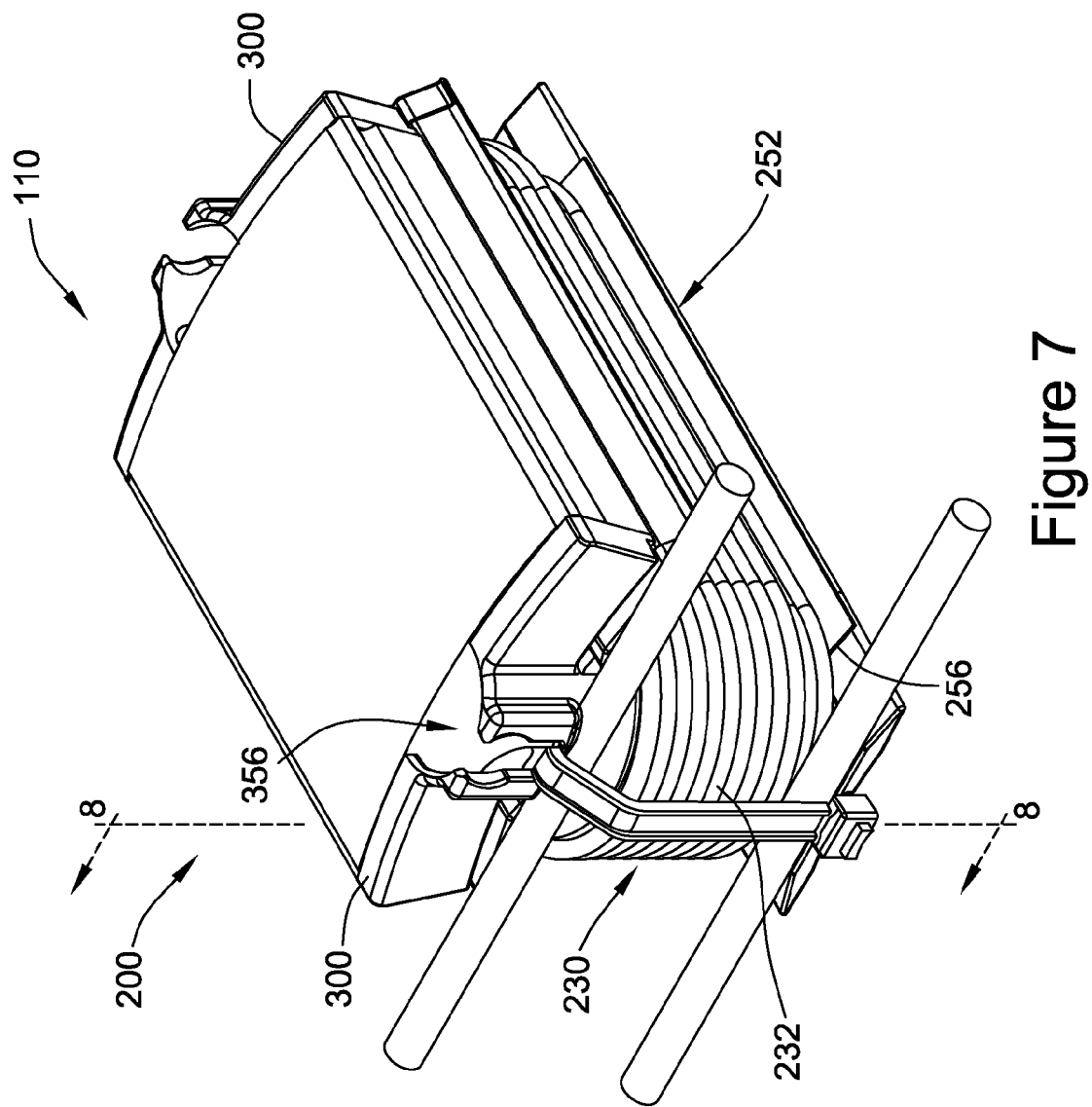
FIG. 7 is a perspective view of a stator winding of an electric motor that includes the end cap of FIG. 1.

Referring now to FIGS. 2, 7 and 8, the stator segment 200 of the core 110 is shown in greater detail utilizing the protrusion 366 and relieved portion 364 aspects of the present invention. End caps 300 are positioned over end faces 256 of each tooth 252 of stator core 110. It should be appreciated that one of the end caps may have one or both of the relieved portion 364 and the protrusion 366 and the other end cap have none one or both of the relieved portion 364 and the protrusion 366. Preferably both end caps are identical and have both the relieved portion 364 and the protrusion 366. Wire 232 is wound around end caps 300 and the tooth 252 to form stator winding 230.

Figure 9:
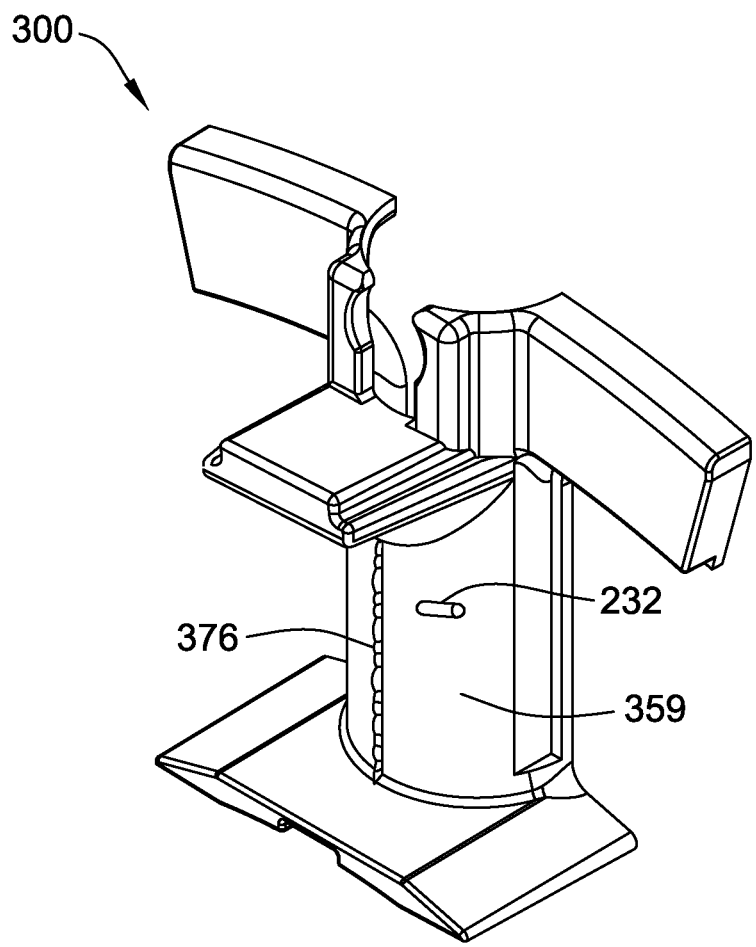
FIG. 9 is a perspective view of the end cap of FIG. 3 showing the guide having been deformed by the wire.
Figure 10:
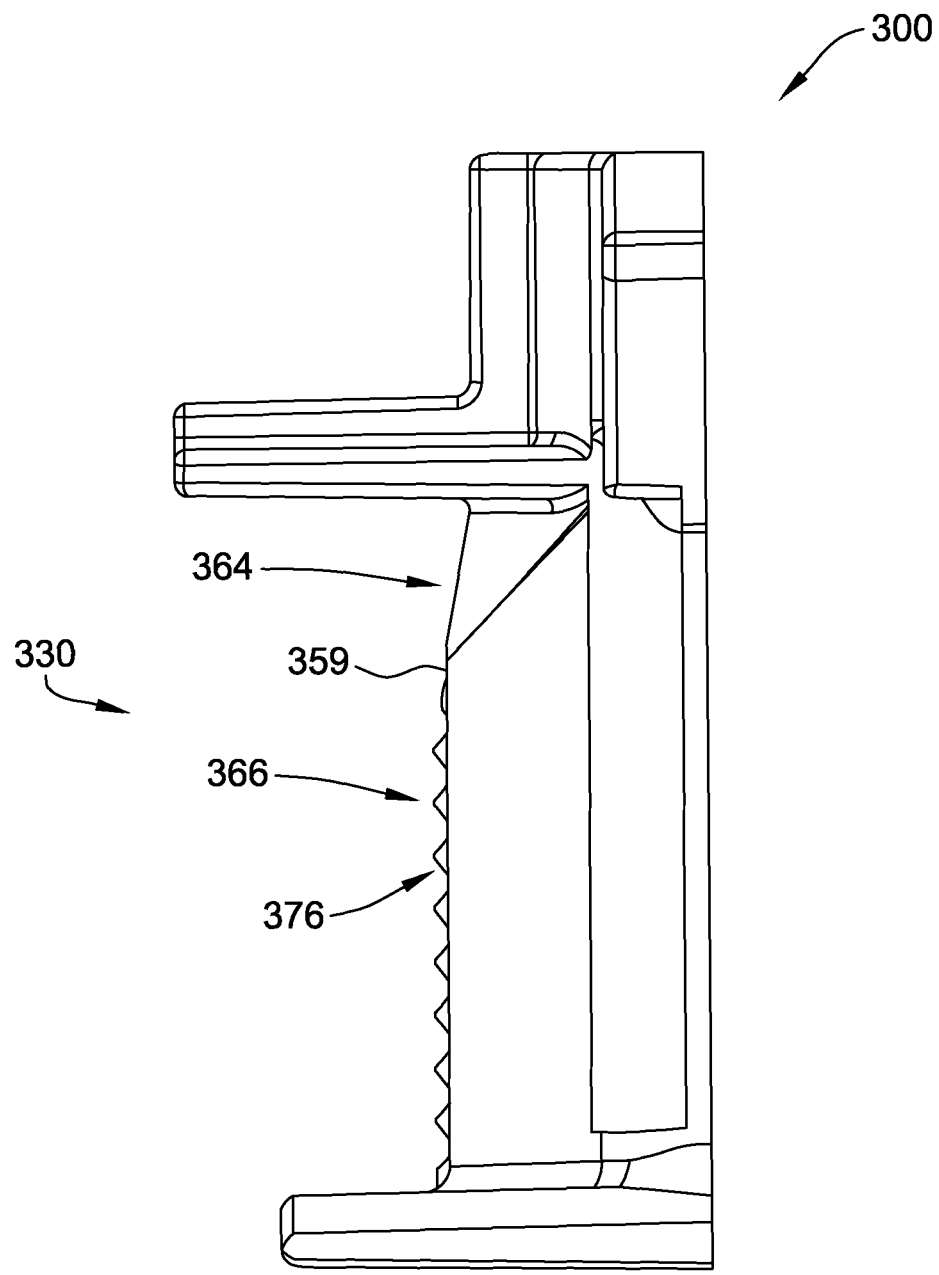
FIG. 10 is a plan view of the end cap of FIG. 9, showing the guide having been deformed by the wire.

Referring now to FIGS. 9 and 10 the end cap 300 is shown removed from a wound stator segment 200. The wire (not shown) forms cradles 376 in the protrusion 366 such that the bottom of the cradle 376 is in alignment with the periphery 359 of the tooth portion 330 of end cap 300. Note that as shown the protrusions 366 of the end caps 300 are made of a crushable or deformable material, such that they leave the cradles 376 in the protrusion 366. However the invention may be practiced with resilient protrusions, such that the cradles disappear when the wire is removed. Further note that the relieved portion 364 does not, as shown, include the protrusion 366 or the cradles 376, as the protrusions may interfere with movement of the wire 232 toward face 362 of stop 360.

Referring again to FIG. 8, the wire 232 deforms the protrusion 366 to provide the cradle 376 for the wire 232 as first layer 370 of the wire 232 is wrapped against the periphery 359 of tooth portion 330 of the end cap 300 to keep it securely in its axial position on end portion. The wire 232 in second layer 372 of the wire 232 is cradled between abutting wires 232 in the first layer 370. Similarly the wire 232 in third layer 374 of the wire is cradled between abutting wires 232 in the second layer 372. For example, adjacent wires 382 ad 384 in the first layer 370 cradle wire 386 in the second layer 372. The wires 232 form coil 380. While the embodiment shown in FIG. 8 has three layers of wires, it should be appreciated that a fourth, fifth and any number of additional layers may be used with this invention. In fact the invention could be practiced with as few as one layer.

The wire 232 in first layer 370 deforms or crushes the protrusion 366 to a level parallel to the periphery 359 of tooth position 330 adjacent the protrusion providing a cradle 376 defined by angle Δ of about 120 degrees as shown. Referring again to FIG. 6, the height H of the protrusion 366 is chosen to provide cradling for wires of different sizes or gauges so that the end cap 300 can be used with those different sizes or gauges of wire. For example, the height H is chosen to provide for use of the end cap with a wire that crushes the protrusion to have a cradle 376 defined by angle Δ of up to 180 degrees and for wires that are progressively smaller until the cradle 376 is defined by angle Δ that is still large enough to prevent axial movement of the wire 232 along periphery 359.

Figure 11:
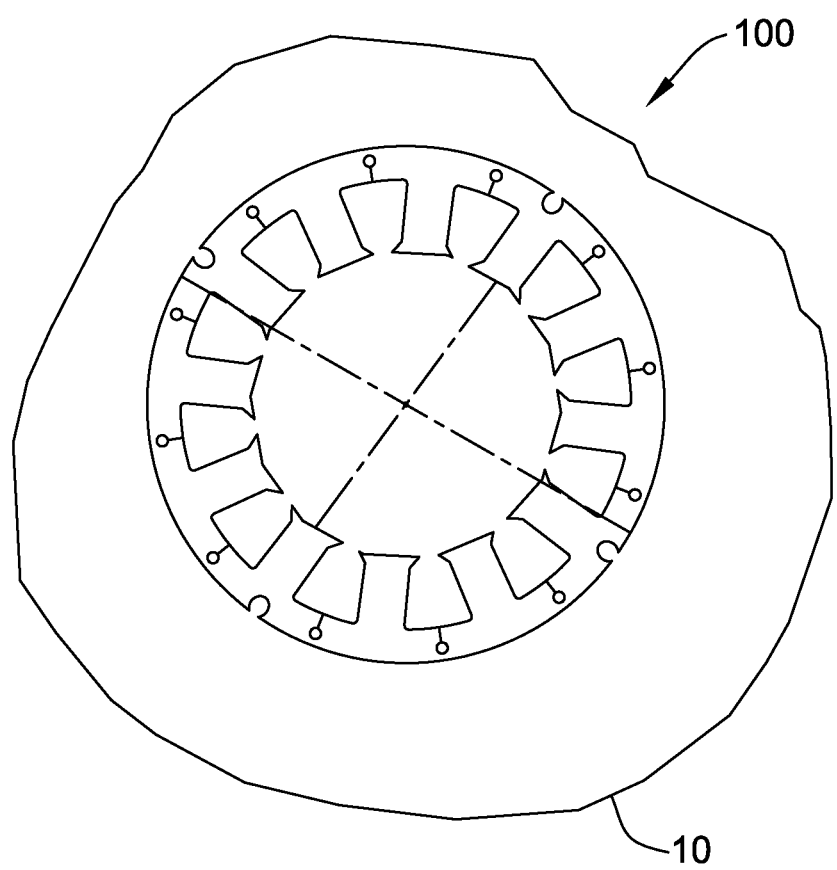
FIG. 11 is a plan view of the roll-up stator of FIG. 2 in a cylindrical or rolled-up configuration.

Referring now to FIG. 11 the stator assembly 100 of FIG. 2 is shown assembled into a cylindrical shape to be assembled into the motor 10 of FIG. 1.

Figure 12:
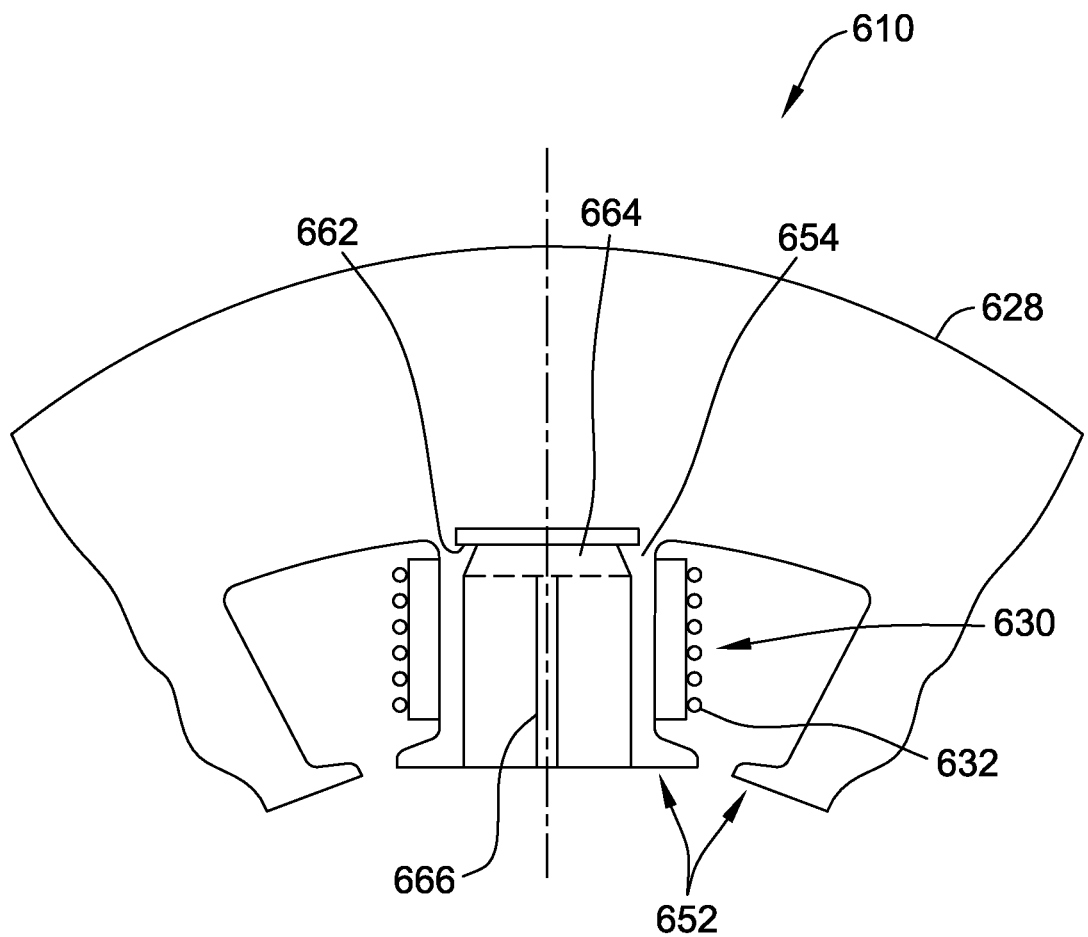
FIG. 12 is a plan view of a portion of a rigid stator of a motor embodying another embodiment of the exemplary wire guide of the present invention.

Referring now to FIG. 12 another embodiment of the invention is shown as electric machine 610. The machine 610 includes a fixed rigid stator core 628 that may be an assembly of stamped laminations and which has a plurality of teeth or projections 652. The teeth 652 are covered by sleeves 654 including a conformable portion 666 and a relieved portion 664. The conformable portion 666 is in the form a longitudinal protrusion with the relieved portion 664 extending from the protrusion 666 to face 662 of sleeve 654. The sleeve 654 may be made of more than one portion and be joined together by any means. The sleeve 654 may cover all or only a portion of the tooth 652. Wires 632 are wound around each of the combinations of sleeves 654 and teeth 652 to form stator windings 630. The wires 632 are wound in part by moving the wires 632 between adjacent teeth 652 by a needle (not shown).

Figure 13:
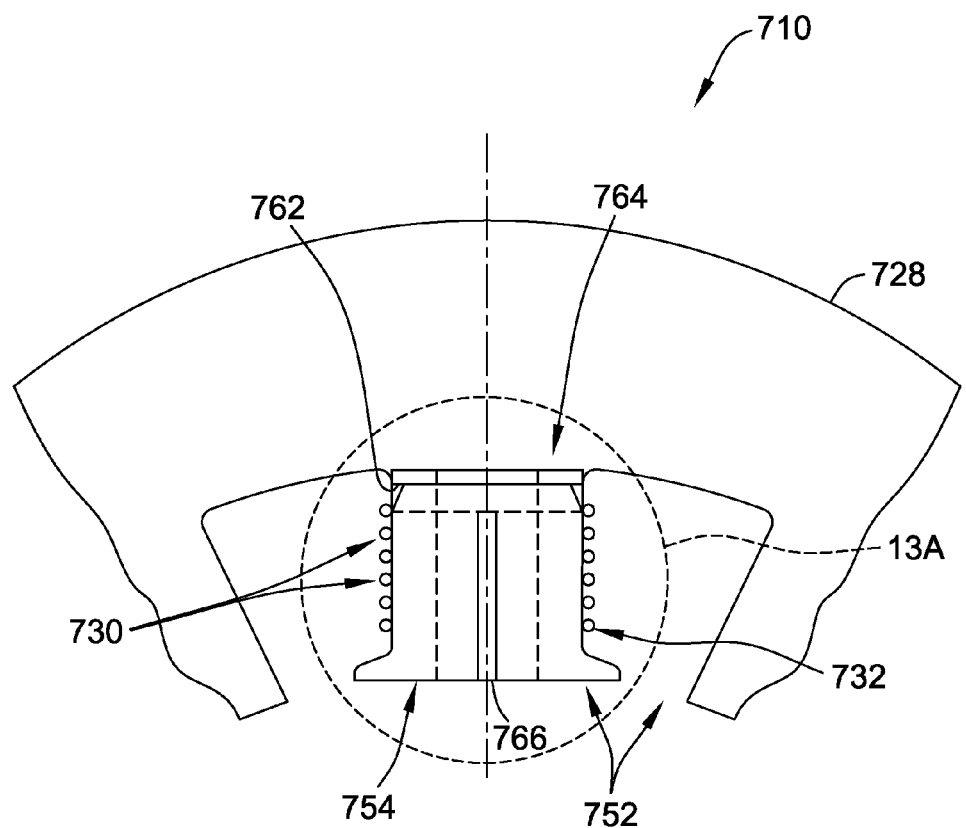
FIG. 13 is a plan view of a portion of a stator with removable bobbin type winding of a motor embodying another embodiment of the exemplary wire guide of the present invention.
Figure 13A:
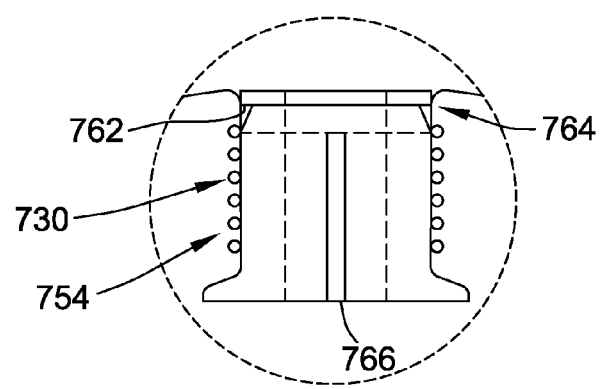
FIG. 13A is a plan view of the bobbin removed from the stator of FIG. 13.

Referring now to FIGS. 13 and 13A, another embodiment of the invention is shown as electric machine 710. The machine 710 includes a fixed rigid stator core 728 that may be an assembly of stamped laminations and which has a plurality of teeth or projections 752. The teeth 752 are covered by a removable sleeve or spool 754 including a conformable portion 766 and a relieved portion 764. As shown only one spool 754 is shown, but it should be appreciated that preferably one spool 754 is positioned over each tooth 752. The conformable portion 766 is in the form a longitudinal protrusion with the relieved portion 764 extending from the protrusion 766 to face 762 of spool 754. The spool 754 may be made of more than one portion and be joined together by any means.

As shown in FIG. 13A, while the spool 754 is separated from its mating tooth 752, wires 732 are wound around each spool 754 to form a stator winding 730. The stator winding 730 is then mounted onto its mating tooth 752.

Figure 14:
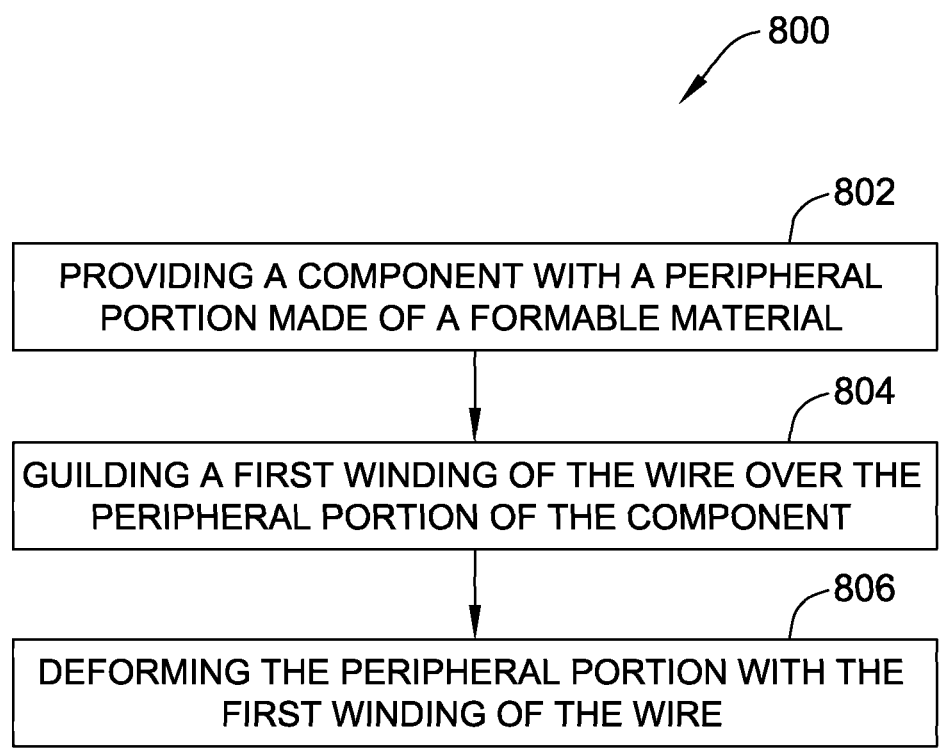
FIG. 14 is a flow chart of an exemplary method for assembling the electric motor shown in FIG. 1.

Referring now to FIG. 14, a flow chart of an exemplary method 800 for guiding a wire 232 while winding a coil 380 of an electric machine 10 (see FIG. 8) is shown. The method 800 includes the step 802 of providing a component 300 (see FIG. 8) with a peripheral portion 366 (see FIG. 8) made of a deformable material. The method 800 further includes the step 804 of guiding a first winding 382 (see FIG. 8) of the wire over the peripheral portion of the component 300 and the step 806 of deforming the peripheral portion 366 (see FIG. 8) with the first winding 382 (see FIG. 8) of the wire.

The method 800 may also include the step of guiding a second winding 384 (see FIG. 8) of the wire over the peripheral portion 366 (see FIG. 8) of the component 300 and in abutting relationship to the first winding 382 and the step of deforming the peripheral portion 366 (see FIG. 8) with the second winding 384 of the wire The method 800 may also include the step of guiding a third winding 386 (see FIG. 8) of the wire over the peripheral portion of the component 300 and in abutting relationship to the first winding 382 and to the second winding 384.

The step 802 of providing the component 300 (see FIG. 8) may include providing the component with a relieved portion 364 (see FIG. 3) and the method 300 may further includes a step of guiding a winding of the wire over the peripheral portion of the component 300 (see FIG. 3).

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wire assembly for use in an electric machine, said assembly comprising:
    a member, said member defining a periphery thereof; and
    a wire, said wire adapted for conducting electrical current there through, at least a portion of said wire wrapped at least partially around a first portion of said member to form a wrapped position, at least a portion of the first portion of the periphery thereof being crushed by said wire when said wire is wrapped at least partially around said member and adapted to assist in maintaining said wire in said wrapped position.

2. An assembly in accordance with claim 1, wherein a portion of the periphery of said member is tapered.

3. An assembly in accordance with claim 1, wherein the portion of the first portion thereof adapted for receiving the wire adapted to conform is adapted to maintain an indentation when the wire is wrapped at least partially around said body.

4. An assembly in accordance with claim 1, wherein said member defines an elongated protrusion extending outwardly there from, at least a portion of said elongated protrusion being conformable when said wire is wrapped at least partially around said member.

5. An assembly in accordance with claim 1, further comprising a core, said member covering at least a portion of said core.

6. An assembly in accordance with claim 1, where said member is arcuate.

7. An assembly in accordance with claim 1, wherein said member comprises a conformable protrusion extending at least 0.010 inches outwardly there from.

8. An assembly in accordance with claim 1, wherein said member comprises:
    an arcuate first portion for cooperation with the wire;
    a second portion extending from a first end of first portion for containing the wire; and
    a third portion extending from a second end of first portion for containing the wire.

9. An assembly in accordance with claim 1, further comprising a second member spaced from the first member, at least a portion of said wire adapted to be wrapped at least partially around said second member, said second member defining a periphery thereof, a least a portion of the periphery of said second member being conformable when said wire is wrapped at least partially around said second member.

10. An assembly in accordance with claim 1, further comprising a stator body defining a base and a plurality of projections extending there from, said member in juxtaposition with one of the plurality of projections of said body.

11. A stator for use in an electric machine, said stator comprising:
    A body having a base and a plurality of projections extending there from;
    a member cooperating with at least one of the plurality of projections, said member defining a periphery thereof; and
    a wire, said wire adapted for conducting electrical current there through, at least a portion of said wire wrapped around at least a first portion of the periphery of said member, at least a portion of the first portion of the periphery thereof being defoimed by said wire when said wire is wrapped at least partially around said member and adapted to maintain an indentation in the first portion of the periphery of said member.

12. A stator in accordance with claim 11, wherein a portion of the periphery of said member is tapered.

13. A stator in accordance with claim 11, wherein the portion of the first portion thereof adapted for receiving the wire adapted to coinform is adapted to be crushed when the wire is wrapped at least partially around said body.

14. A stator in accordance with claim 11, wherein said member defines an elongated protrusion extending outwardly there from, at least a portion of said elongated protrusion being conformable when said wire is wrapped at least partially around said member.

15. A stator in accordance with claim 11, further comprising a core, said member covering at least a portion of said core.

16. A stator in accordance with claim 11, wherein said body comprises a plurality of segments, at least some of said segments being moveable with respect to at least some of said segments.

17. A cap for covering a portion of a stator for use in an electric machine having wire to conduct electricity there through, said cap comprising a body adapted to closely conform to at least a portion of the stator, said body defining a periphery thereof, the periphery including a portion thereof adapted for receiving the wire, at least a first portion of the portion thereof adapted for receiving the wire adapted to maintain a groove in said body when the wire is wrapped at least partially around said body.

18. A cap in accordance with claim 17, wherein said body defines an elongated protrusion extending outwardly there from, at least a portion of said elongated protrusion being conformable when said wire is wrapped at least partially around said body.

19. A cap in accordance with claim 17, wherein the stator includes a projection, said body for covering at least a portion of the projection.

20. A cap in accordance with claim 17, wherein the first portion of the portion thereof adapted for receiving the wire adapted to conform is adapted to be crushed when the wire is wrapped at least partially around said body.

21. A cap in accordance with claim 17, wherein said body comprises a conformable protrusion extending at least 0.010 inches outwardly there from.

* * * * *